United States Patent
Terajima

(10) Patent No.: US 11,412,114 B2
(45) Date of Patent: Aug. 9, 2022

(54) IMAGE SHOOTING DEVICE AND ELECTRONIC APPARATUS

(71) Applicant: New Shicoh Motor Co., Ltd., Zhejiang (CN)

(72) Inventor: Kokichi Terajima, Kanagawa (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 0 days.

(21) Appl. No.: 17/203,940

(22) Filed: Mar. 17, 2021

(65) Prior Publication Data

US 2021/0321023 A1    Oct. 14, 2021

(30) Foreign Application Priority Data

Apr. 10, 2020   (CN) .......................... 202010279751.7

(51) Int. Cl.
*H04N 5/225* (2006.01)
*G02B 7/02* (2021.01)
*H04N 5/232* (2006.01)

(52) U.S. Cl.
CPC ........... *H04N 5/2253* (2013.01); *G02B 7/021* (2013.01); *H04N 5/2252* (2013.01); *H04N 5/23241* (2013.01); *G03B 2217/007* (2013.01)

(58) Field of Classification Search
CPC ...... G03B 2217/007; G03B 2205/0023; G03B 2205/0069; G03B 17/561; G03B 17/56; H04N 5/3698; H04N 5/23241; H04N 5/2253; H04N 5/2252; H04N 5/2257; G02B 7/021; F16M 11/04
See application file for complete search history.

(56) References Cited

U.S. PATENT DOCUMENTS

| | | | |
|---|---|---|---|
| 8,009,372 B2* | 8/2011 | Jin ........................... | G02B 7/08 359/814 |
| 2005/0041131 A1* | 2/2005 | Terane ............... | H04N 5/23293 348/E5.025 |
| 2007/0110424 A1* | 5/2007 | Iijima .................. | H04N 5/2257 396/133 |
| 2015/0022620 A1* | 1/2015 | Siminoff ............. | H04M 1/0291 348/14.02 |

(Continued)

FOREIGN PATENT DOCUMENTS

| | | |
|---|---|---|
| JP | 2012-244614 | 12/2012 |
| JP | 2015-61230 | 3/2015 |
| JP | 2018-129863 | 8/2018 |

OTHER PUBLICATIONS

English language abstract of JP 2012-244614.

(Continued)

*Primary Examiner* — Chiawei Chen
(74) *Attorney, Agent, or Firm* — Fildes & Outland, P.C.

(57) ABSTRACT

Provided is an image shooting device and an electronic apparatus, which enable suppression of shaking of a camera unit. The image shooting device (12) includes: a camera unit (26); and a holder (28) configured to movably support the camera unit (26), wherein the holder (28) includes a power transmission-side coil (36), and the camera unit (26) includes a power reception-side coil (38), and wherein the power transmission-side coil (36) and the power reception-side coil (38) are opposed to each other across a space therebetween.

15 Claims, 9 Drawing Sheets

(56) References Cited

U.S. PATENT DOCUMENTS

| | | | | |
|---|---|---|---|---|
| 2016/0190859 A1* | 6/2016 | Blum | ......................... | F41J 5/10 |
| | | | | 348/372 |
| 2017/0195533 A1* | 7/2017 | Seo | ...................... | H04N 5/2254 |
| 2017/0307964 A1* | 10/2017 | Okamoto | ............... | G03B 17/02 |
| 2019/0369466 A1* | 12/2019 | Clearman | ............ | G03B 17/561 |
| 2020/0041878 A1* | 2/2020 | Lan | ........................ | G08C 23/04 |

OTHER PUBLICATIONS

Office Action dated Mar. 15, 2022 in corresponding Japanese application No. 2021-041614 and English translation.
English language machine translation of JP 2015-61230.
English language machine translation of JP 2018-129863.

* cited by examiner

IMAGE SHOOTING DEVICE AND ELECTRONIC APPARATUS

BACKGROUND OF THE INVENTION

1. Field of the Invention

The present invention relates to an image shooting device and an electronic apparatus.

2. Description of the Related Art

There is known an image shooting device for, for example, a dashboard camera to be mounted to a vehicle, which includes a camera unit and a holder configured to support the camera unit (Japanese Patent Application Laid-open No. 2012-244614).

It is conceivable to suppress shaking of the camera unit, which is supported movably with respect to the holder, by using inertia of the camera unit. In this case, a mechanical shock is liable to be applied to the camera unit due to vibration or shock caused by running of the vehicle, which may be transmitted through a power cable connected to the camera unit. Thus, the shaking of the camera unit cannot be suppressed.

SUMMARY OF THE INVENTION

The present invention has an object to provide an image shooting device and an electronic apparatus, which enable suppression of shaking of a camera unit.

According to one aspect of the present invention, there is provided an image shooting device, including: a camera unit; and a holder configured to movably support the camera unit, wherein the holder includes a power transmission-side coil, and the camera unit includes a power reception-side coil, and wherein the power transmission-side coil and the power reception-side coil are opposed to each other across a space therebetween.

It is preferred that the power transmission-side coil and the power reception-side coil be opposed to each other in a winding axis direction or a winding radial direction of the power transmission-side coil and the power reception-side coil.

Further, it is preferred that the holder include a feed circuit configured to feed an alternating current to the power transmission-side coil, and that the feed circuit be to receive a power cable to be connected thereto.

As a mechanism configured to allow the camera unit to be movable with respect to the holder, for example, each of the camera unit and the holder may have a spherical-surface portion so that the camera unit is movable through intermediation of the spherical-surface portions. The camera unit may be movable through intermediation of an elastic member or through intermediation of a gimbal mechanism.

According to another aspect of the present invention, an electronic apparatus including the image shooting device is provided.

According to the present invention, the power transmission-side coil is provided to the holder, and the power reception-side coil is provided to the camera unit. The power transmission-side coil and the power reception-side coil are opposed to each other across the space therebetween. With this arrangement, power can be fed from the holder side to the camera unit side through electromagnetic induction. Thus, the power cable is not required to be connected to the camera unit side. Accordingly, vibration, which may be transmitted through the power cable, is prevented to enable suppression of shaking of the camera unit.

DESCRIPTION OF THE EMBODIMENTS

Embodiments of the present invention are described with reference to the accompanying drawings.

Figure 1:
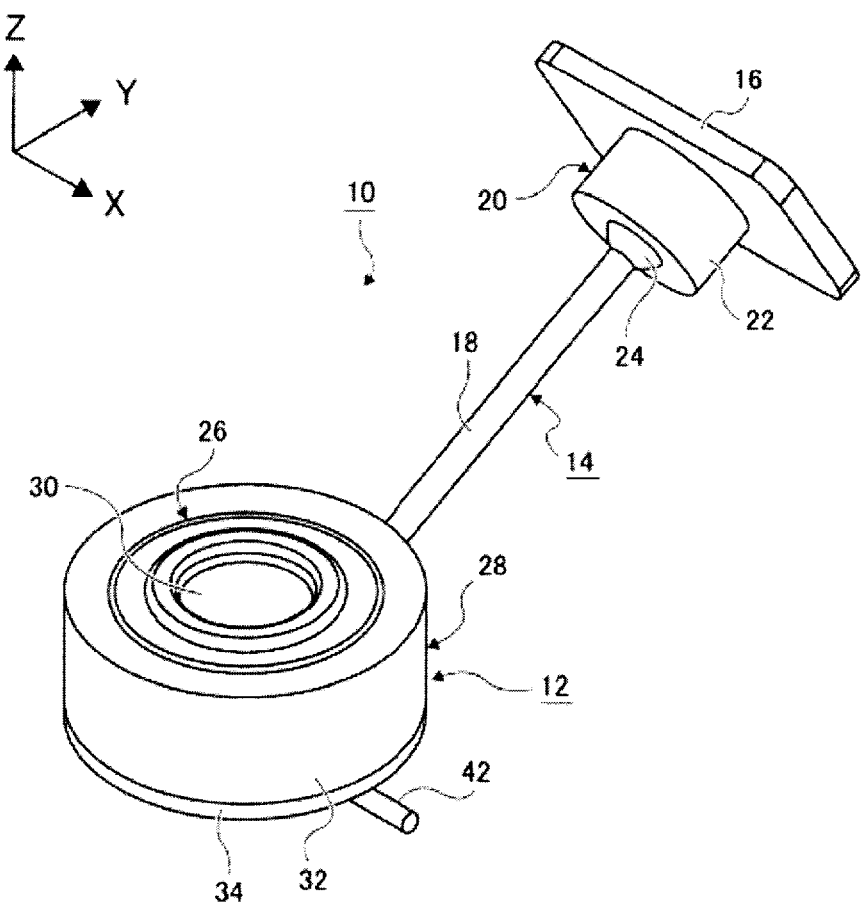
FIG. 1 is a perspective view for illustrating a dashboard camera as an electronic apparatus according to a first embodiment of the present invention when the dashboard camera is viewed from diagonally above.
Figure 2:
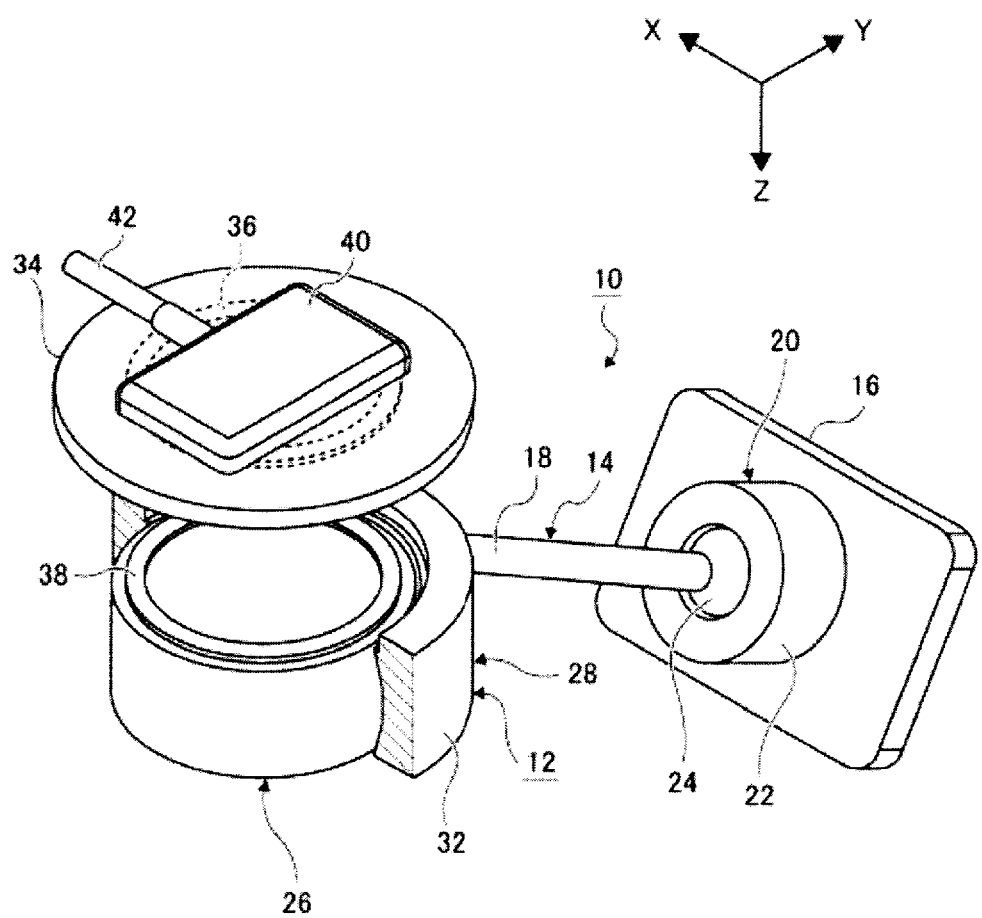
FIG. 2 is an exploded perspective view, partially in section, for illustrating the dashboard camera as the electronic apparatus according to the first embodiment of the present invention when the dashboard camera is viewed from diagonally below.

In FIG. 1 and FIG. 2, there is illustrated a dashboard camera 10 as an example of an electronic apparatus according to a first embodiment of the present invention.

The dashboard camera 10 includes an image shooting device 12 and a mounting device 14. The mounting device 14 is configured to mount the image shooting device 12 to a vehicle.

The mounting device 14 includes a fixing member 16 having a flat plate-like shape and a coupling member 18 having a bar-like shape. The coupling member 18 is coupled to the fixing member 16. The fixing member 16 and the coupling member 18 are connected to each other through intermediation of a connecting portion 20. The connecting portion 20 has a cylindrical portion 22 and a spherical portion 24. The cylindrical portion 22 is provided at a center of a back surface of the fixing member 16. The spherical portion 24 is provided at one end of the coupling member 18. An inner surface of the cylindrical portion 22 is formed to have a spherical-surface shape. The spherical portion 24 is fitted to the inner surface of the cylindrical portion 22 so that the coupling member 18 can be turned 360 degrees about the cylindrical portion 22. Further, another end of the coupling member 18 is fixed to a holder main body 32 described later. Meanwhile, a front surface side of the fixing member 16 is fixed to a windshield or a vehicle body of the vehicle.

The image shooting device 12 includes a camera unit 26 and a holder 28. The holder 28 is configured to movably support the camera unit 26.

The camera unit 26 includes a lens 30 that is normally directed in a Z-axis direction in an XYZ orthogonal coordinate system. An optical axis direction of the lens 30 matches the Z-axis direction. In the first embodiment, the lens 30 is directed in a forward direction corresponding to a traveling direction of the vehicle. However, the direction of the lens 30 is not limited to the forward direction. The lens 30 may be directed in an optional direction such as a backward direction with respect to the traveling direction, an upward direction, or a lateral direction. Further, the camera unit 26 includes an image sensor configured to detect an image formed by focusing light through the lens 30. The camera unit 26 may further include a driving unit, which includes, for example, a coil and a magnet or a shape-memory alloy, and is configured to move a position of the lens 30.

The camera unit 26 has an outer shape obtained by cutting away a front portion and a rear portion of a sphere in the Z-axis direction. Further, the holder 28 includes the holder main body 32 and a back plate 34. The holder main body 32 has a cylindrical outer shape. The back plate 34 has a disc-like shape, and is provided on a −Z direction side (back side) of the holder main body 32, and is fixed to the holder main body 32. An inner surface of the holder main body 32 has a spherical-surface shape. An outer surface of the camera unit 26 is fitted to the inner surface of the holder main body 32 in such a manner that the holder main body 32 surrounds the camera unit 26 with a center axis extending in the Z-axis direction. With the arrangement described above, the camera unit 26 is turnable about movable about each of an X axis, a Y axis, and the Z axis with respect to the holder main body 32. The inner surface of the holder main body 32 or the outer surface of the camera unit 26 may be covered with a material excellent in lubricity so that the camera unit 26 smoothly turns with respect to the holder main body 32.

And a power transmission-side coil 36 having an annular shape is fixed to a +Z-side surface of the back plate 34 of the holder 28. The power transmission-side coil 36 is provided in such a manner that is wound on the Z-axis direction. Meanwhile, a power reception-side coil 38 similarly having an annular shape is fixed to a −Z-side surface of the camera unit 26. The power transmission-side coil 36 and the power reception-side coil 38 are opposed to each other across a space in the Z-axis direction, specifically, a winding axis direction therebetween.

A feed circuit 40 is mounted on a −Z-side surface of the back plate 34 of the holder 28. A power cable 42 is connected to the feed circuit 40. The feed circuit 40 is configured to convert electric power supplied through the power cable 42 to an alternating current. An AC current oscillating at a frequency falling within a range of, for example, from several tens of hertz to several hundreds of hertz is fed to the power transmission-side coil 36. When the AC current is fed to the power transmission-side coil 36, an AC magnetic field is generated through and around the power transmission-side coil 36 and the power reception-side coil 38. As a result, an induced current flows through the power reception-side coil 38.

Meanwhile, when, for example, a capacitor is connected to the power reception-side coil 38, an LC resonance circuit is formed. The LC resonance circuit is set so that resonance occurs at a frequency matched with an oscillation frequency of the power transmission-side coil 36. Thus, the power reception-side coil 38 can efficiently receive electric power. The electric power obtained by the power reception-side coil 38 is used for an image shooting operation of the camera unit 26.

Further, image data detected by the camera unit 26 is transmitted wirelessly, for example, through Wi-Fi (trademark).

For example, when the power cable 42 and the image shooting device 12 are shaken together with the vehicle to apply angular acceleration to the image shooting device 12 while the vehicle is running, the camera unit 26 that is turnably supported slides inside the holder 28 due to inertia and tends to maintain a posture before being shaken. At this time, the power cable 42 is connected to the holder 28 side. Hence, the camera unit 26 is little affected by the shaking of the power cable 42, and is isolated from the shaking of the vehicle. As a result, blur of a shot image is reduced.

Figure 3:
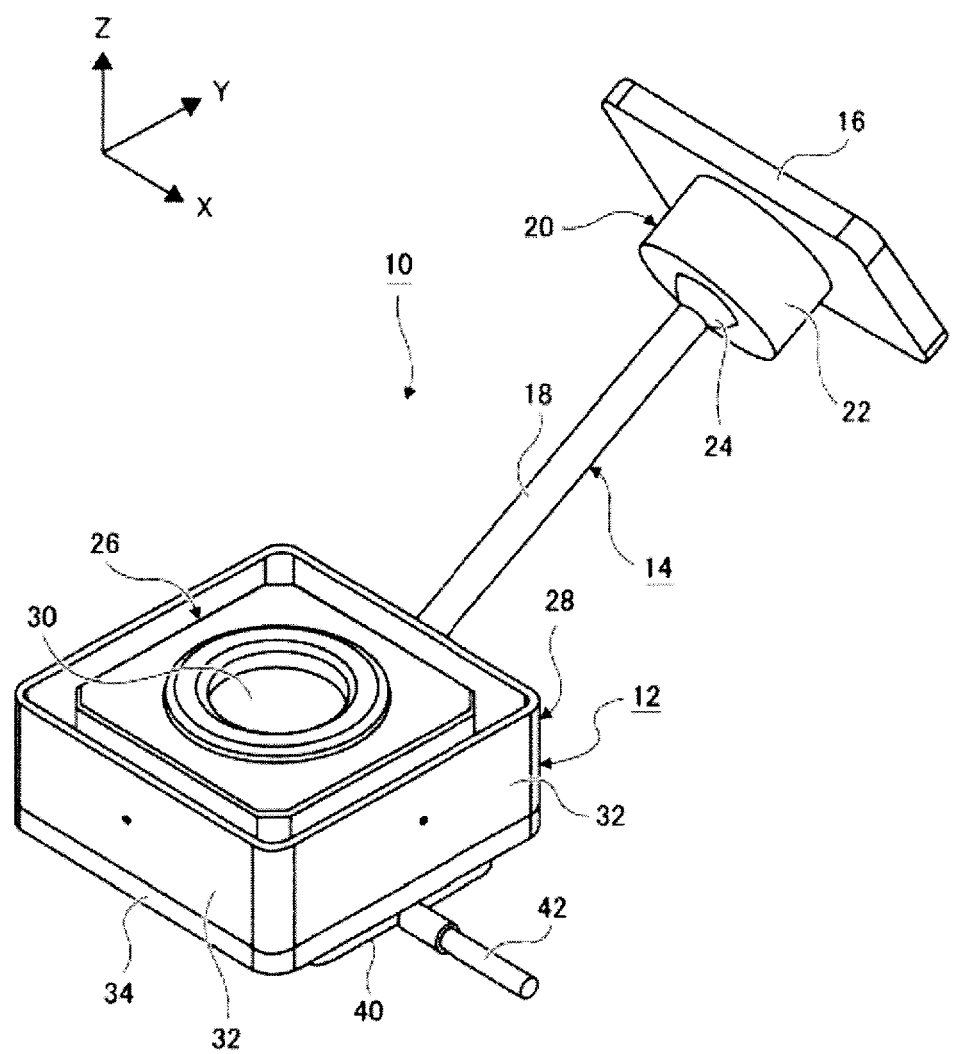
FIG. 3 is a perspective view for illustrating a dashboard camera as an electronic apparatus according to a second embodiment of the present invention when the dashboard camera is viewed from diagonally above.
Figure 4:
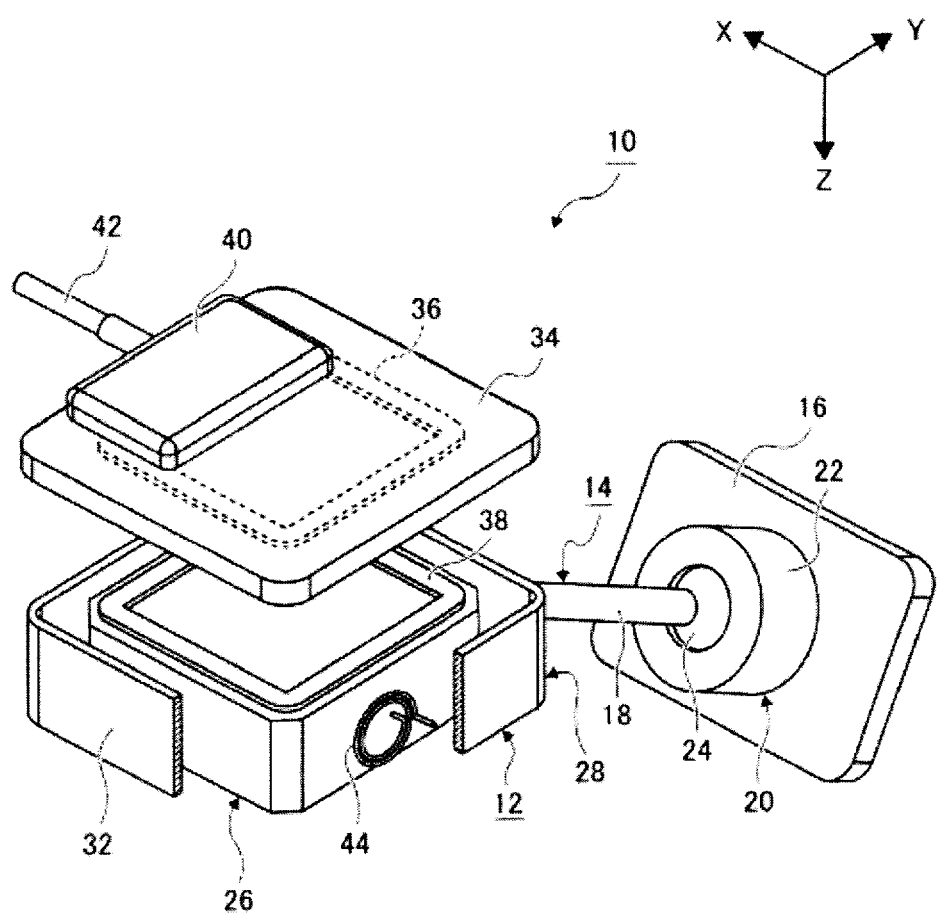
FIG. 4 is an exploded perspective view, partially in section, for illustrating the dashboard camera as the electronic apparatus according to the second embodiment of the present invention when the dashboard camera is viewed from diagonally below.

In FIG. 3 and FIG. 4, there is illustrated a dashboard camera 10 as an example of an electronic apparatus according to a second embodiment of the present invention.

The dashboard camera 10 of the second embodiment is different from the dashboard camera 10 of the first embodiment in shapes of the camera unit 26 and the holder 28 and in structure for supporting the camera unit 26.

The camera unit 26 has a cuboidal shape. The holder 28 includes the holder main body 32 having a rectangular shape. The holder main body 32 surrounds the camera unit 26 in such a manner that the center axis extends in the Z-axis direction, across a space therebetween. Further, the back plate 34 having a rectangular shape is fixed to the −Z direction side (back side) of the holder main body 32 of the holder 28.

The camera unit 26 is supported in the holder 28 in such a manner as to be movable through intermediation of suspension springs 44. Each of the suspension springs 44 is formed by bending both ends of a wire spring formed in a substantially annular or spiral shape in axial directions and opposite directions of the substantially annular or spiral portion. One end of each of the suspension springs 44 is connected to a central portion of each of four side surfaces of the holder main body 32. Another end of each of the suspension springs 44 is connected to a corresponding side surface of the camera unit 26. With the suspension springs 44 arranged as described above, the camera unit 26 is supported in the holder main body 32 in such a manner as to be turnable about each of the X axis, the Y axis, and the Z axis. In the second embodiment, an outer shape of each of the suspension springs 44 is circular. However, the outer shape of each of the suspension springs 44 is not limited to the circular shape.

In the second embodiment, each of the power transmission-side coil 36 and the power reception-side coil 38 is formed in a rectangular outer shape. The power transmission-side coil 36 is fixed to the back plate 34, and the power reception-side coil 38 is fixed to the camera unit 26. The power transmission-side coil 36 and the power reception-side coil 38 are opposed to each other in the Z-axis direction, specifically, the winding axis direction, across a space therebetween.

In the second embodiment, as in the first embodiment, when the power cable 42 and the image shooting device 12 are shaken to apply angular acceleration to the image shooting device 12, the camera unit 26 that is turnably supported moves inside the holder 28 due to inertia and tends to maintain a posture before being shaken. At the same time, the power cable 42 is connected to the holder 28 side. Hence, the camera unit 26 is little affected by the shaking of the power cable 42, and is isolated from the shaking of the vehicle. As a result, blur of a shot image is reduced.

In the second embodiment, similar components and portions to those in the first embodiment are denoted by the same reference symbols in the drawings, and description thereof is omitted.

Figure 5:
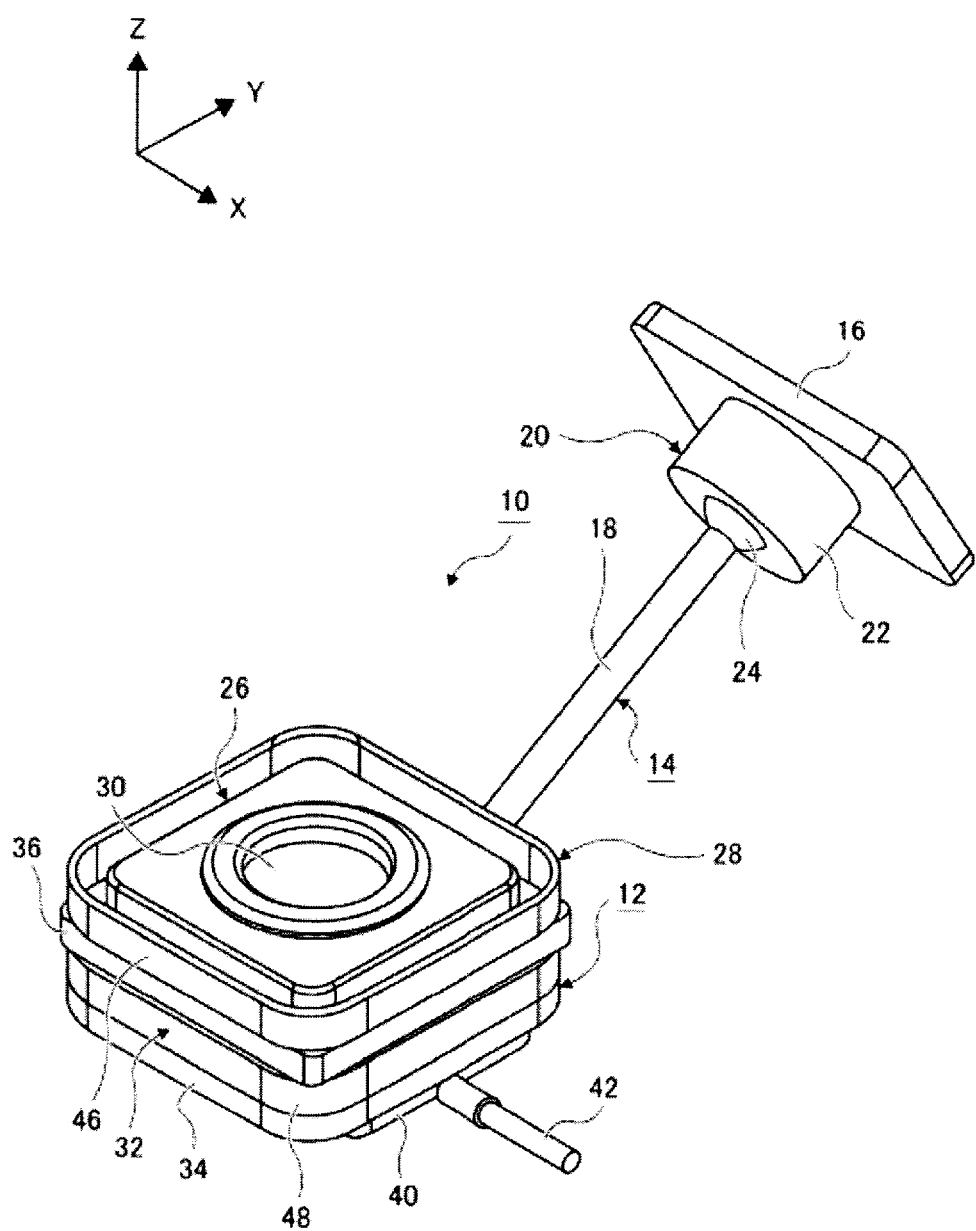
FIG. 5 is a perspective view for illustrating a dashboard camera as an electronic apparatus according to a third embodiment of the present invention when the dashboard camera is viewed from diagonally above.
Figure 6:
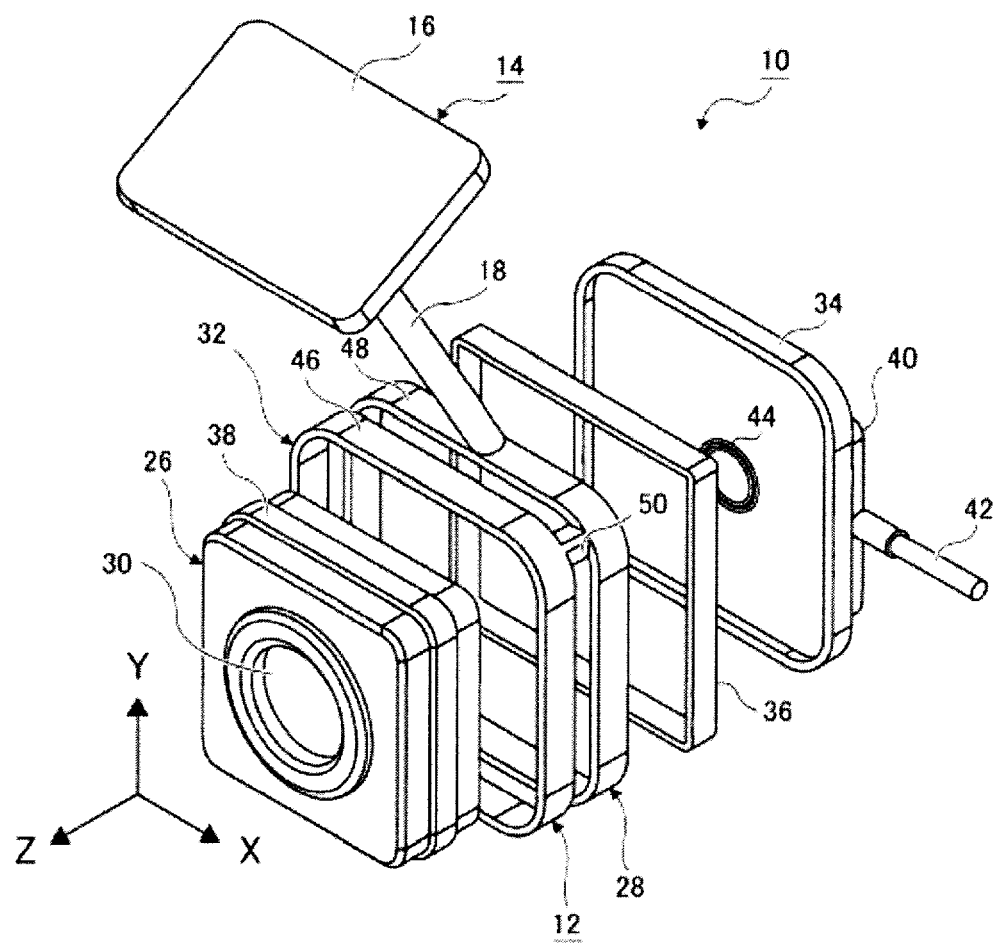
FIG. 6 is an exploded perspective view for illustrating the dashboard camera as the electronic apparatus according to the third embodiment of the present invention when the dashboard camera is viewed from a side at an angle.
Figure 7:
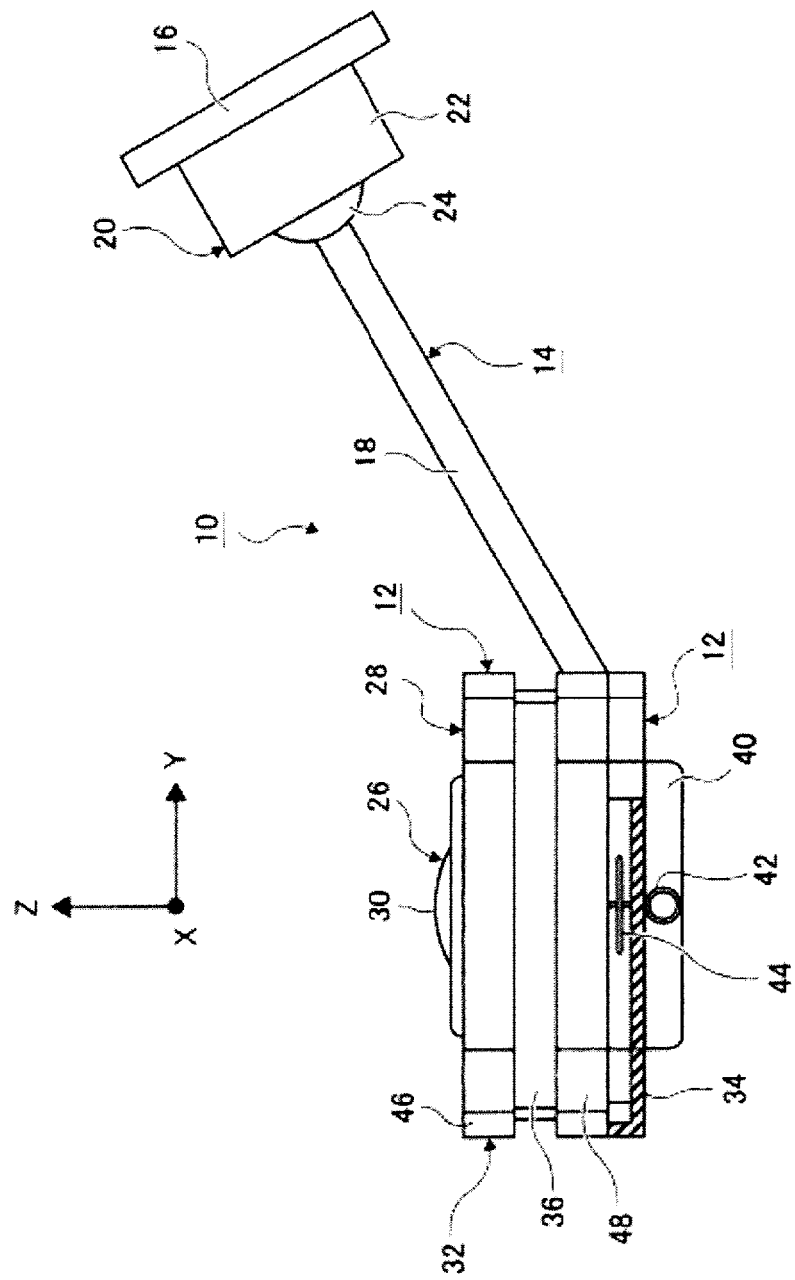
FIG. 7 is a side view, partially in section, for illustrating the dashboard camera as the electronic apparatus according to the third embodiment of the present invention.

In FIG. 5 to FIG. 7, there is illustrated a dashboard camera 10 as an example of an electronic apparatus according to a third embodiment of the present invention.

The dashboard camera 10 of the third embodiment is different from the dashboard camera 10 of the first embodiment in configurations of the power transmission-side coil 36 and the power reception-side coil 38 and in structure for supporting the camera unit 26.

In the third embodiment, the camera unit. 26 has a rectangular shape as that in the second embodiment. However, the power reception-side coil 38, which is formed in a rectangular frame-like shape with a center axis extending in the Z-axis direction, is mounted to side surfaces of the camera unit. 26.

Further, the holder main body 32 of the holder 28 is divided into two parts in the Z-axis direction. Specifically, the holder main body 32 includes a first frame portion 46 and a second frame portion 48, each having a rectangular sectional shape. The first frame portion 46 and the second frame portion 48 are connected at four corners of the first frame portion 46 and the second frame portion 48 through intermediation of winding bobbin portions 50. A wire material for forming the power transmission-side coil 36 is wound around the winding bobbin portions 50 along sides surfaces of the first frame portion 46 and the second frame portion 48. In this manner, the power transmission-side coil 36 having a rectangular frame-like shape is formed and mounted around the winding bobbin portions 50. The power transmission-side coil 36 and the power reception-side coil 38 described above are opposed to each other in X-axis and Y-axis directions, specifically, a winding radial direction across a space therebetween.

Further, the camera unit 26 is supported by the suspension spring 44 provided on the −Z-side surface of the back plate 34 of the holder 28 in such a manner as to be turnable about each of the X axis, the Y axis, and the Z axis.

In the third embodiment, as in the second embodiment, when the power cable 42 and the image shooting device 12 are shaken to apply angular acceleration to the image shooting device 12, the camera unit 26 that is turnably supported moves inside the holder 28 due to inertia and tends to maintain a posture before being shaken. The power cable 42 is connected to the holder 28 side. Hence, the camera unit 26 is little affected by the shaking of the power cable 42, and is isolated from the shaking of the vehicle. As a result, blur of a shot image is reduced.

In the third embodiment, similar components and portions to those in the second embodiment are denoted by the same reference symbols in the drawings, and description thereof is omitted.

Figure 8:
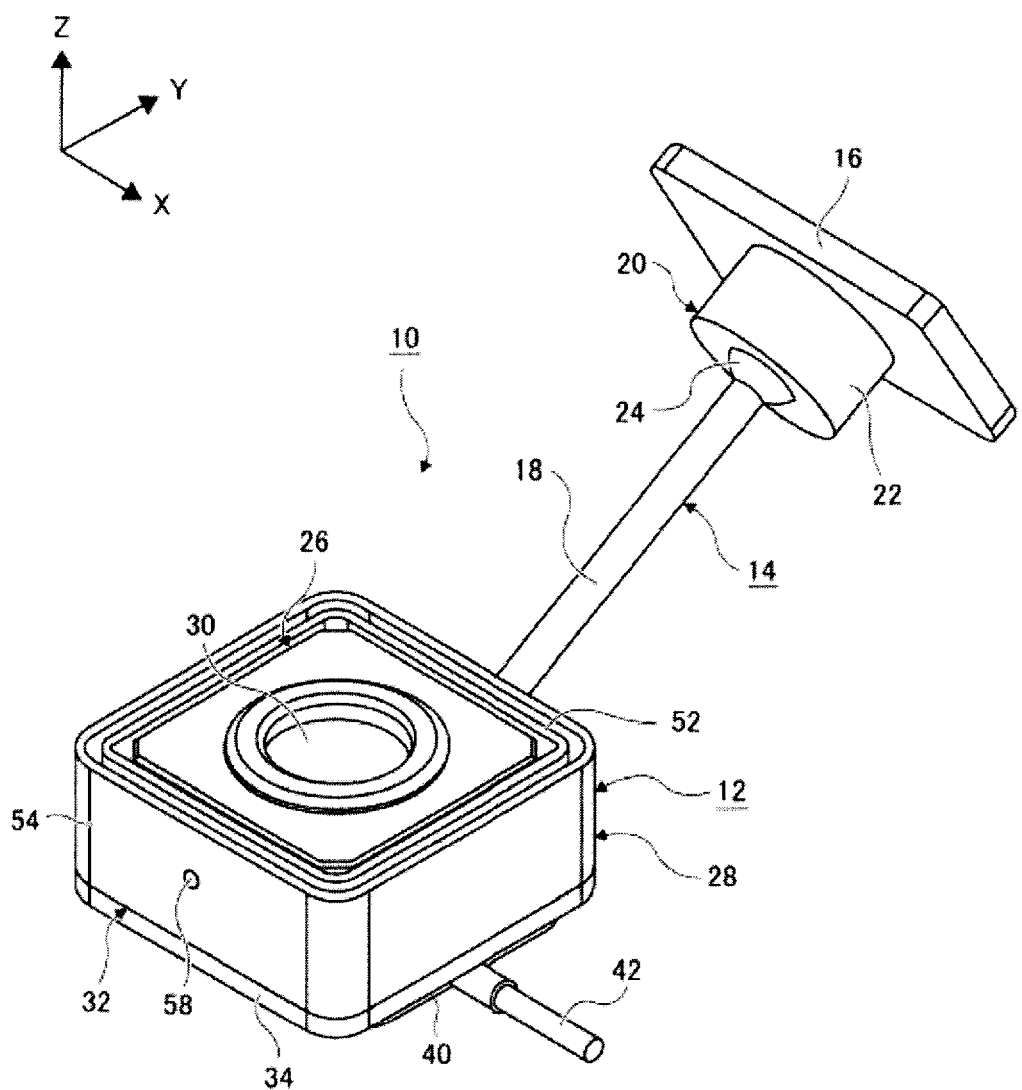
FIG. 8 is a perspective view for illustrating a dashboard camera as an electronic apparatus according to a fourth embodiment of the present invention when viewed from diagonally above.
Figure 9:
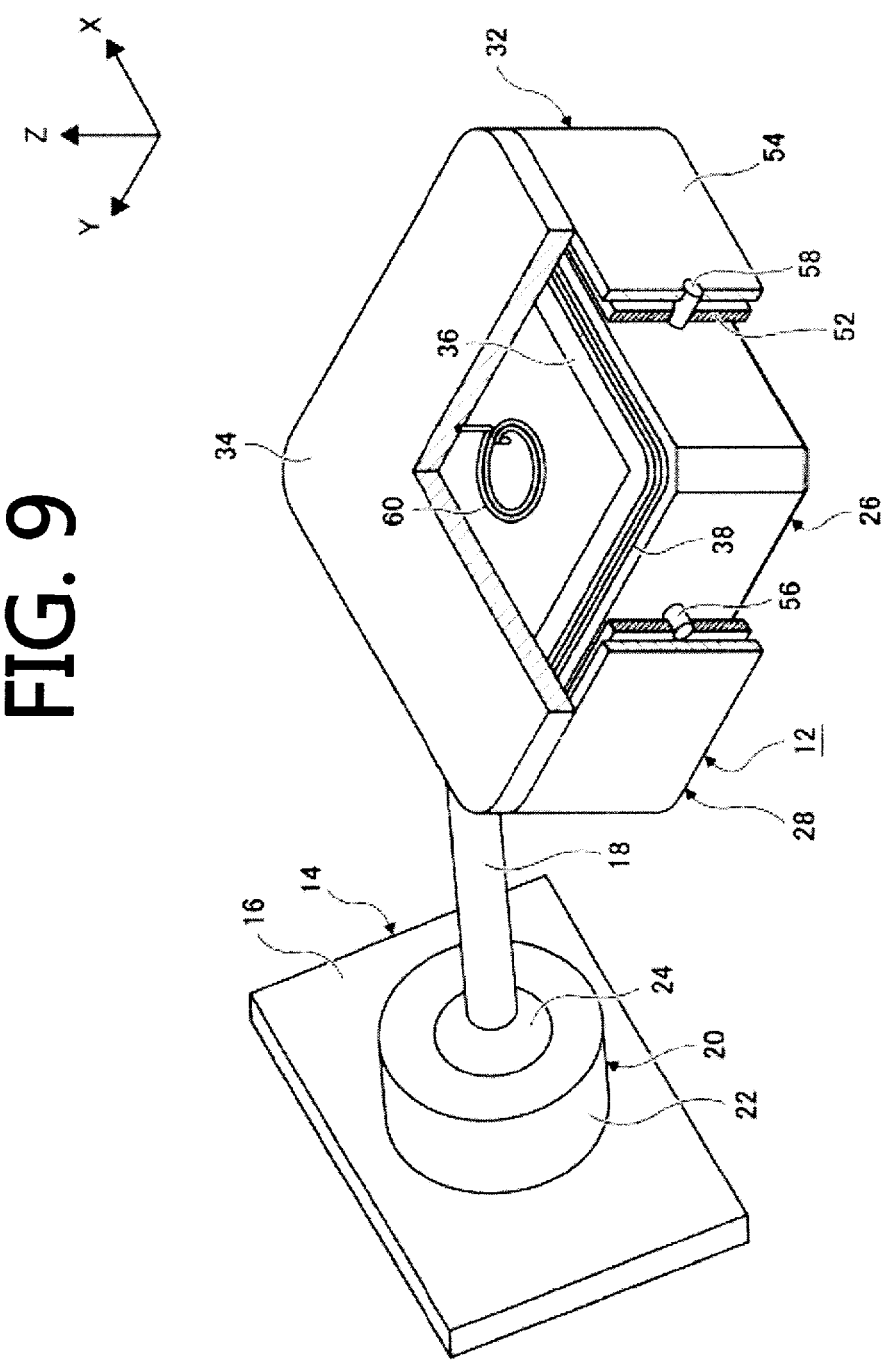
FIG. 9 is an exploded perspective view, partially in section, for illustrating the dashboard camera as the electronic apparatus according to the fourth embodiment of the present invention when viewed from diagonally below.

In FIG. 8 and FIG. 9, there is illustrated a dashboard camera 10 as an example of an electronic apparatus according to a fourth embodiment of the present invention.

The dashboard camera 10 of the fourth embodiment is different from the dashboard camera 10 of the second embodiment described above in a shape of the holder 28 and in structure for supporting the camera unit 26.

In the fourth embodiment, the camera unit 26 is supported in the holder 28 in such a manner as to be movable through intermediation of a gimbal mechanism.

Specifically, the holder 28 includes an inner frame 52 and an outer frame 54, each having a rectangular shape. The inner frame 52 and the outer frame 54 are provided around the camera unit 26. In this case, the camera unit 26 and the inner frame 52 are supported by pins 56 for turning about X axis, which are provided to pass through X-axis-direction-side surfaces of the camera unit 26 and the inner frame 52, in such a manner as to be turnable about the X axis. Further, the camera unit 26, the inner frame 52, and the outer frame 54 are supported by pins 58 for turning about Y axis, which are provided to pass through Y-side surfaces of the camera unit 26, the inner frame 52, and the outer frame 54, in such a manner as to be turnable about the Y axis.

AND a return spring 60 is provided at a center between the back plate 34 of the holder 28 and the camera unit 26. The return spring 60 has a similar shape as a shape of the suspension spring 44. The return spring 60 has one end connected to a front surface of the back plate 34 and another end connected to a back surface of the camera unit 26, which is opposed to the front surface of the back plate 34. When the camera unit 26 is turned about the X axis or the Y axis, the return spring 60 acts to return the camera unit 26 to original direction. In this manner, the return spring 60 supports the camera unit 26 in a suspended manner so that the camera unit 26 is turnable about two axes corresponding to the X axis and the Y axis.

In the fourth embodiment, the camera unit 26 is supported in the holder 28 through intermediation of a gimbal structure. Thus, the camera unit 26 turns due to inertia and tends to maintain a posture before being shaken. When the power cable 42 or the image shooting device 12 is shaken to apply angular acceleration to the image shooting device 12, the camera unit 26 oscillates inside the holder 28 due to inertia and tends to maintain a posture before being shaken. At this time, the power cable 42 is connected to the holder 28 side. Hence, the camera unit 26 is little affected by the shaking of the power cable 42, and is isolated from the shaking of the vehicle. As a result, blur of a shot image is reduced.

In the fourth embodiment, similar components and portions to those in the second embodiment are denoted by the same reference symbols in the drawings, and description thereof is omitted.

The embodiments have been described with an example in which the present invention is applied to the dashboard camera. However, the present invention is applicable not only to the dashboard camera but also to, for example, other camera apparatus to be mounted to a bicycle or to electronic equipment such as a drone. The installation of the power transmission-side coil 36 and the power reception-side coil 33 may be changed in the first, second, or fourth embodiment based on the installation in the third embodiment. Specifically, the power transmission-side coil 36 and the power reception-side coil 38 may be installed in such a manner as to be opposed to each other in a radial direction of coil windings. Similarly, the installation of the power transmission-side coil 36 and the power reception-side coil 38 may be changed in the third embodiment based on the installation in the first, second, or fourth embodiment. Specifically, the power transmission-side coil 36 and the power reception-side coil 38 may be installed in such a manner as to be opposed to each other in an axial direction of the coil windings.

What is claimed is:

1. An image shooting device, comprising:
a camera unit; and
a holder configured to movably support the camera unit,
wherein the holder includes a power transmission-side coil, and the camera unit includes a power reception-side coil,
wherein the power transmission-side coil and the power reception-side coil are opposed to each other across a space therebetween, wherein
the camera unit is supported in the holder in such a manner as to be movable through intermediation of four elastic members, wherein
said each elastic member has a shape that is formed by bending both ends of a wire spring formed in a substantially annular or spiral shape in a direction perpendicular to a plate surface of the substantially annular or spiral shape so that the both ends are directed apart each other; and wherein
a central portion of each of four side surfaces of a main body of the holder is connected with one end of one of the four elastic members while another end of said one of the four elastic members is connected to a side surface of the camera unit.

2. The image shooting device according to claim 1, wherein the power transmission-side coil and the power reception-side coil are opposed to each other in a winding axis direction of the power transmission-side coil and the power reception-side coil.

3. The image shooting device according to claim 1, wherein the power transmission-side coil and the power reception-side coil are opposed to each other in a winding radial direction of the power transmission-side coil and the power reception-side coil.

4. The image shooting device according to claim 1, wherein the holder includes a feed circuit configured to feed an alternating current to the power transmission-side coil, and wherein the feed circuit is to receive a power cable to be connected thereto.

5. An electronic apparatus, comprising the image shooting device of claim 1.

6. An image shooting device, comprising:
a camera unit; and
a holder configured to movably support the camera unit, wherein
the holder includes a power transmission-side coil, and
the camera unit includes a power reception-side coil, wherein
the power transmission-side coil and the power reception-side coil are opposed to each other across a space therebetween, wherein
the camera unit is supported in the holder in such a manner as to be movable through intermediation of an elastic member, wherein
the elastic member has a shape that is formed by bending both ends of a wire spring formed in a substantially annular or spiral shape in a direction perpendicular to a plate surface of the substantially annular or spiral shape so that the both ends are directed apart each other; and wherein
one end of the elastic member is connected to a central portion of a back surface of a main body of the holder while another end of the elastic member is connected to a back surface of the camera unit.

7. The image shooting device according to claim 6, wherein the power transmission-side coil and the power reception-side coil are opposed to each other in a winding axis direction of the power transmission-side coil and the power reception-side coil.

8. The image shooting device according to claim 6, wherein the power transmission-side coil and the power reception-side coil are opposed to each other in a winding radial direction of the power transmission-side coil and the power reception-side coil.

9. The image shooting device according to claim 6, wherein the holder includes a feed circuit configured to feed an alternating current to the power transmission-side coil, and wherein the feed circuit is to receive a power cable to be connected thereto.

10. An electronic apparatus, comprising the image shooting device of claim 6.

11. The image shooting device according to claim 6, wherein the holder includes an inner frame and an outer frame that are provided around the camera unit and have rectangular shapes; wherein
outer surfaces of the camera unit that direct one direction thereof and inner surfaces of the inner frame that oppose against the outer surfaces directing said one direction of the camera unit are rotatably supported by rotation pins extending along said one direction, and wherein
outer surfaces of the inner frame that direct another direction perpendicular to said one direction and inner surfaces of the outer frame that oppose against the outer surfaces directing said another direction of the inner frame are rotatably supported by rotation pins extending along said another direction.

12. The image shooting device according to claim 11, wherein the power transmission-side coil and the power reception-side coil are opposed to each other in a winding axis direction of the power transmission-side coil and the power reception-side coil.

13. The image shooting device according to claim 11, wherein the power transmission-side coil and the power reception-side coil are opposed to each other in a winding radial direction of the power transmission-side coil and the power reception-side coil.

14. The image shooting device according to claim 11, wherein the holder includes a feed circuit configured to feed an alternating current to the power transmission-side coil, and wherein the feed circuit is to receive a power cable to be connected thereto.

15. An electronic apparatus, comprising the image shooting device of claim 6.

* * * * *